United States Patent
Ortiz

(10) Patent No.: US 7,567,509 B2
(45) Date of Patent: Jul. 28, 2009

(54) METHODS AND SYSTEMS FOR JITTER MINIMIZATION IN STREAMING MEDIA

(75) Inventor: Luis Ortiz, Hyde Park, MA (US)

(73) Assignee: Dialogic Corporation, Montreal, Quebec (CA)

(*) Notice: Subject to any disclaimer, the term of this patent is extended or adjusted under 35 U.S.C. 154(b) by 1094 days.

(21) Appl. No.: 10/242,776

(22) Filed: Sep. 13, 2002

(65) Prior Publication Data

US 2004/0052209 A1 Mar. 18, 2004

(51) Int. Cl.
*H04J 1/16* (2006.01)
(52) U.S. Cl. ............. 370/230; 370/229; 370/503
(58) Field of Classification Search .............. None
See application file for complete search history.

(56) References Cited

U.S. PATENT DOCUMENTS

| | | | |
|---|---|---|---|
| 4,439,856 A * | 3/1984 | Ulug | 370/419 |
| 4,890,222 A | 12/1989 | Kirk | |
| 5,237,695 A | 8/1993 | Skokan et al. | |
| 5,245,414 A * | 9/1993 | Wischermann | 348/500 |
| 5,384,563 A | 1/1995 | Massey | |
| 5,404,353 A * | 4/1995 | Ben-Michael et al. | 370/235 |
| 5,566,180 A | 10/1996 | Eidson et al. | |
| 5,740,174 A * | 4/1998 | Somer | 370/402 |
| 5,844,890 A | 12/1998 | Delp et al. | |
| 5,875,309 A | 2/1999 | Itkowsky et al. | |
| 5,949,757 A * | 9/1999 | Katoh et al. | 370/232 |
| 6,215,789 B1 | 4/2001 | Keenan et al. | |
| 6,236,623 B1 | 5/2001 | Read et al. | |
| 6,246,702 B1 | 6/2001 | Fellman et al. | |
| 6,272,131 B1 | 8/2001 | Ofek | |
| 6,272,151 B1 | 8/2001 | Gupta et al. | |
| 6,359,899 B1 | 3/2002 | Krishnakumar et al. | |
| 6,363,065 B1 | 3/2002 | Thornton et al. | |
| 6,370,159 B1 | 4/2002 | Eidson | |
| 6,374,336 B1 | 4/2002 | Peters et al. | |
| 6,377,573 B1 | 4/2002 | Shaffer et al. | |
| 6,377,579 B1 | 4/2002 | Ofek | |
| 6,389,010 B1 | 5/2002 | Kubler et al. | |
| 6,389,468 B1 | 5/2002 | Muller et al. | |
| 6,701,372 B2 * | 3/2004 | Yano et al. | 709/232 |
| 2002/0150048 A1 * | 10/2002 | Ha et al. | 370/231 |
| 2003/0058760 A1 * | 3/2003 | Kuroda et al. | 369/47.3 |

* cited by examiner

*Primary Examiner*—Phuc H Tran
(74) *Attorney, Agent, or Firm*—Weingarten, Schurgin, Gagnebin & Lebovici LLP

(57) ABSTRACT

A method for transmitting data includes monitoring a packet-based traffic flow to obtain traffic flow information. The method also includes calculating a transmission interval for transmitting a packet-based communication into the packet-based traffic flow, where the calculation is based on the traffic flow information and a clock signal obtained from a clock. The packet-based communication is transmitted into the packet-based traffic flow during the transmission interval, based on the clock signal.

26 Claims, 10 Drawing Sheets

METHODS AND SYSTEMS FOR JITTER MINIMIZATION IN STREAMING MEDIA

TECHNICAL FIELD

This invention relates to packet-based communications, and more particularly to the scheduling of packet-based communications through a shared resource.

BACKGROUND

Conventional telecommunications infrastructure often utilizes a Time-Division-Multiplexed ("TDM") approach to real-time communications, such as telephone conversations and videoconferences, in which a dedicated circuit is provided for carrying a plurality of communication streams. The TDM approach provides low latency (delay), which is desirable in delivering media such as voice. On the other hand, the TDM approach also requires the use of a dedicated connection, which in turn requires a relatively large amount of bandwidth. Also, the TDM approach to voice communications is frequently implemented via a public exchange and associated long-distance communications infrastructure, which can be expensive to develop and maintain.

Another approach to implementing communications flow is a packet-based approach. A packet-based approach tries to gain bandwidth efficiency by dividing data into discrete packets, and then sending the packets over a network via a "virtual" circuit utilizing, ideally, the most efficient available transmission path. Combining packets and supporting many more "connections" in such a manner provides an ability to support more communication flows within an amount of bandwidth comparable to the TDM approach.

The packet-based approach was originally designed for network traffic that did not require particularly low latency values. For example, an email may be easily sent over a network using the packet-based approach, since the packets can be reconstructed at a destination computer once all packets have traversed the network. Even if some percentage of packets are lost, the email or other such communication may often be reconstructed to a sufficient level of accuracy.

It would be advantageous to use the packet-based approach to transmitting low-latency communications such as voice, since the packet-based approach is efficient and does not require large levels of infrastructure. Delays and disruptions to low-latency communications such as voice in a packet-based transmission scheme, however, may easily damage the communications to the point that they become undesirable or unusable. For example, two people holding a phone conversation via such a system may find there is significant delay between an end of a spoken sentence by one user and the receipt of the sentence by the other user. Additionally, a level of static in the call may become so high that the users may be annoyed by the background noise, or may actually be unable to hear one another sufficiently well to continue the conversation. Similarly, parties on a videoconference may find the transmitted visual images to be undesirably or unsuitably low in quality.

What is needed is an approach that enables packet-based communications through a network, while reducing any associated variance in delay, or "jitter," of the communications.

SUMMARY

In one general aspect, data is transmitted by monitoring a packet-based traffic flow to obtain traffic flow information. Then, based on the traffic flow information and a clock signal obtained from a clock, a transmission interval for transmitting a packet-based communication into the packet-based traffic flow may be calculated. In this way, the packet-based communication may be transmitted into the packet-based traffic flow during the transmission interval, based on the clock signal.

In another general aspect, data is transmitted by a system that includes a packet detector operable to monitor a packet-based traffic flow and thereby obtain traffic flow information, as well as a clock operable to output a clock signal. Thus, a correlation determination circuit operates to calculate a transmission interval, based on the traffic flow information and the clock signal, such that a packet generator may generate a packet-based communication in approximate synchronization with the transmission interval.

In another general aspect, a computer has a processor for executing instructions stored on an associated storage media, where the instruction include a first code segment for monitoring a packet-based traffic flow, as well as a second code segment for calculating a transmission interval for transmitting a packet-based communication, where the transmission interval provides a first reduction in a chance of collision between the packet-based communication and the packet-based traffic flow. The instructions also include a third code segment for transmitting the packet-based communications.

In another general aspect, data is transmitted by a system that includes a plurality of data sources, the plurality of data sources each transmitting data via a common transport medium. Each of the plurality of data sources includes a packet generator operable to generate packets for transmission via the common transport medium, as well as a transmission coordination circuit operable to communicate with remaining ones of the plurality of data sources to establish a virtual clock, the virtual clock thereafter maintained by each of the plurality of data sources and operable to govern a timing of packet transmission by the packet generator. Finally, the system may include a phase adjuster operable to adjust a phase of the packets in accordance with instructions from the transmission coordination circuit.

Implementations provide an improved quality of service for real-time, packet-based communications. Such communications include, for example, voice and video conferencing communications. Jitter in the communications may be reduced by coordinating a timing of packets from different sources attempting to share a common network resource. In this way, packets from a large number of sources may share the common network resource(s) in a reliable and efficient manner. Moreover, the implementations do not require a master clock for all of the sources, or any other complicated or computation-intensive timing scheme for reducing jitter. Advantageously, the implementations may even be used in a heterogeneous environment, in which only some subset of the sources are utilizing the implementations.

The details of one or more implementations of the invention are set forth in the accompanying drawings and the description below.

DETAILED DESCRIPTION

Figure 1:
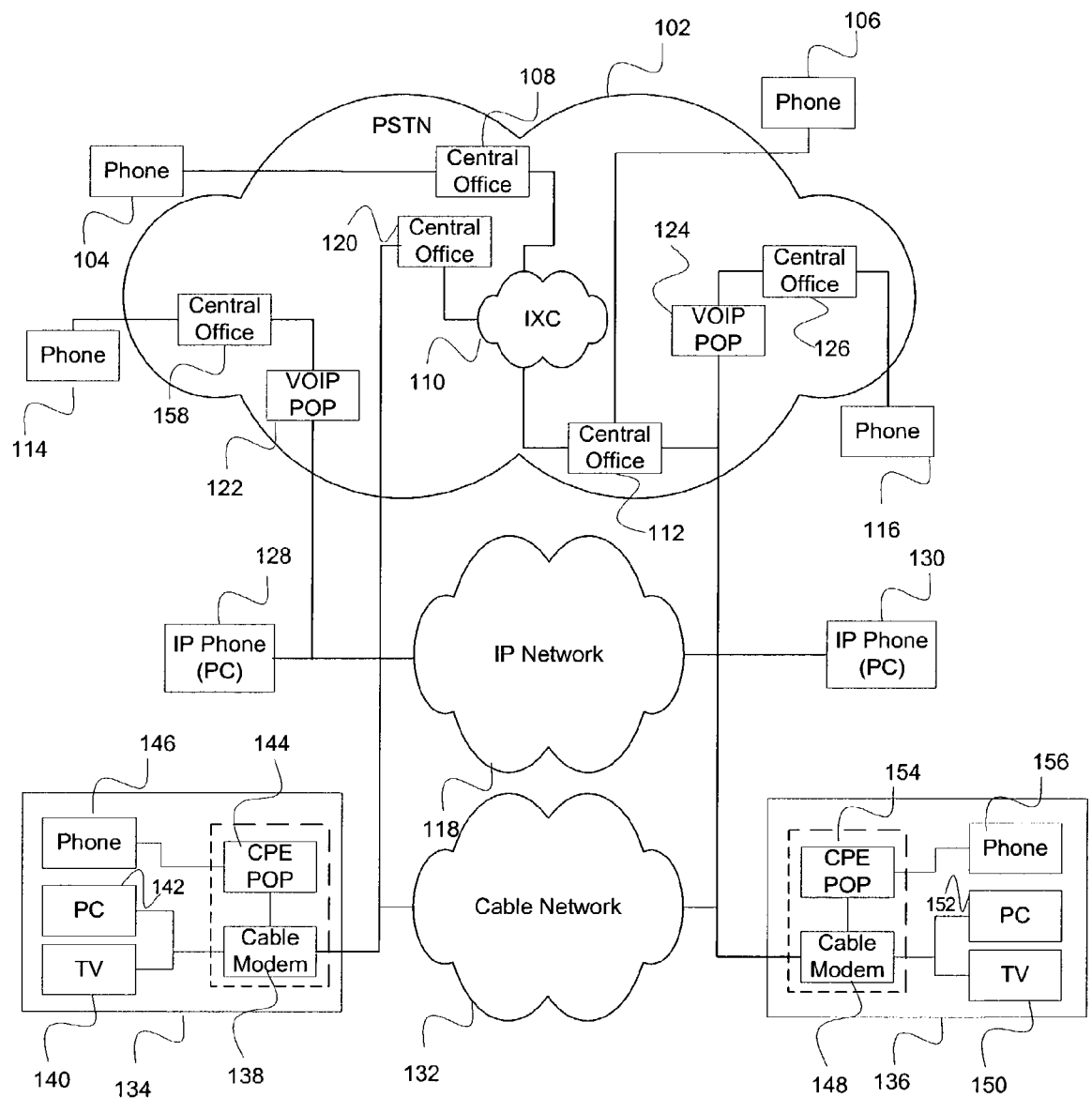
FIG. 1 is a block diagram illustrating a number of scenarios in which real-time data transmissions are implemented.

FIG. 1 illustrates a number of scenarios in which real-time data transmissions, such as voice transmissions, are implemented. In FIG. 1, a Public Switched Telephone Network ("PSTN") 102 allows a user of a phone 104 to communicate with a user of a phone 106. In particular, a user of phone 104 may, upon dialing a phone number of phone 106, be connected to a central office location 108. Such a central office location 108 may be relatively close to phone 104, and may be operated by a traditional local access exchange carrier, such as Verizon.

Central office 108 may convert the analog signal received from phone 104 into a digital signal for transmission over, for example, T1 lines to an Inter Exchange Carrier ("IXC") network 110, which may also be operated by a traditional long-distance carrier, such as AT&T. IXC 110 may be, for example, a private network of very high-speed, cross-country connections, whereby the phone call from phone 104 is routed to a second central office 112, converted back to analog format, and passed on to phone 106.

As referred to above, such communications rely on a dedicated connection to be created and maintained for the phone call from phone 104 to phone 106. Moreover, PSTN 102 and IXC Network 110 are very expensive to create and maintain, and may involve many interconnections between different companies' networks.

A second technique for initiating and conducting a phone call, for example, from a phone 114 to a phone 116, makes use of an Internet Protocol ("IP") Network 118. Such a network typically utilizes packet-based communications, as discussed above. More specifically, a call from phone 114 is directed to a central office 158, converted to a digital format, and then routed to a Voice Over IP (VOIP) point-of-presence ("POP") 122. VOIP POP 122 converts the call into a packet-based transmission for sending over IP Network 118. Finally, a second VOIP POP 124 receives the call from phone 114 via IP Network 118, and routes the call to a central office 126, which in turn forwards the call to phone 116.

It should be understood that central offices 120 and 126 could be part of a PSTN, or could be a separate entity connected to VOIP POP 122/124. Also, VOIP POP 122/124 may be co-located with central office 158/126, and both central office 158/126 and VOIP POP 122/124 may be operated by a long-distance provider. In particular, VOIP POP 122/124 may be operated by a local exchange carrier or long-distance provider providing "dial-around" service, in which a consumer may dial a special access code that automatically forwards the consumer's call via VOIP POP 122/124 and IP Network 118, rather than (solely) through a PSTN such as network 102.

It is also possible to route a call directly from an IP phone 128 to IP Network 118, and thereby to a second IP phone 130. Such IP phones require specially-designed software for converting analog voice signals into packet-based, real-time communications for transmission over the IP Network 118, and may be operated, for example, by installing such software on a personal computer equipped with a microphone and speaker for receiving/outputting the voice communications.

Cable providers may also provide phone service in a variety of ways, directing such service over a privately-owned Cable Network 132, IP Network 118, and/or PSTN 102. Such a cable provider may provide phone service between a consumer location 134 and a consumer location 136. In so doing, the cable provider will typically install a cable modem 138 in consumer location 134, where the cable modem 138 is connected to a television 140 and/or a personal computer 142. The cable modem operates to convert transmissions from television 140 or personal computer 142 into formats appropriate for sending over the desired network. The cable provider may also install a Customer Premises Equipment ("CPE") POP 144 in consumer location 134, which interacts with cable modem 138 and a phone 146 to transmit calls from phone 146 directly to, for example, IP Network 118. Correspondingly, cable modem 148, a television 150, a personal computer 152, a CPE POP 154 and/or a phone 156 at consumer location 136 may be used to receive the call from consumer location 134. It should be understood that cable modem 138 may be included in a common box with CPE POP 144, or may be separate from the CPE POP 144.

Generally speaking, it should be understood that any originating device in FIG. 1 may communicate with any of the receiving devices in FIG. 1, as long as the appropriate technology is in place for making any necessary conversions of data. For example, a user of phone 146 might communicate via IP Network 118 with a user of phone 116 or IP phone 130, or via PSTN 102 with user of phone 106. Similarly, a user of personal computer 142 might communicate with phone 116, IP phone 130 or phone 106.

It should be understood from the above description of FIG. 1 that devices referred to as "phones" may include any type of "real-time" media traffic, such as voice communication, video conferencing, or fax transmissions. A distinguishing feature of this type of traffic compared to most other traditional data traffic (e.g., file transfers, emails, and web site visits) is that the data should be delivered at a constant rate, instead of in bursts as is common with other data traffic. However, achieving a constant data rate for real-time, packet-based communications is problematic, and therefore (as discussed above), variation in delay (jitter) of constant-rate data packets is a matter of relatively more importance than variation of more traditional packet-based communications.

One source of jitter relates to packets being transmitted by multiple sources via a shared resource. For example, in large networks sending real-time communications such as voice, fax, or other data over, for example, an IP network 118, packets from multiple sources are often transmitted over a communications link, or some other shared resource, such as a router or a gateway. This competition for a shared resource is discussed in more detail with respect to FIG. 2.

Figure 2:
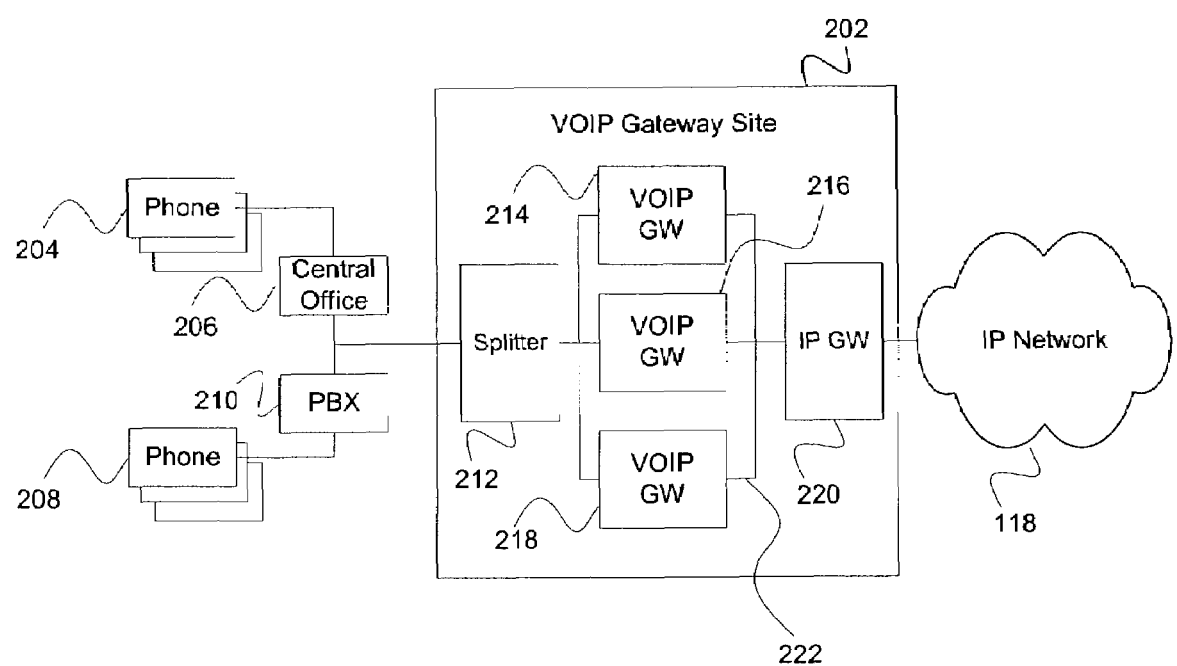
FIG. 2 is a block diagram illustrating an example of a VOIP ("Voice Over Internet Protocol") Gateway site.

FIG. 2 illustrates an example of a VOIP Gateway site. In FIG. 2, a VOIP Gateway ("GW") site 202 allows a phone 204 connected to a central office 206 to communicate with IP Network 118. Similarly, VOIP GW site 202 allows a phone 208 connected to a Private Branch Exchange (PBX) 210 to connect with IP Network 118. PBX 210 may be, for example, a telephone system within an enterprise that switches calls between enterprise users on local lines while allowing all users to share a certain number of external phone lines. One purpose of a PBX is to save the cost of requiring a line for each user to the telephone company's central office. It should be understood that any of the central offices in FIGS. 1 and 2 might be considered to be a PBX.

Within VOIP GW site 202, splitter 212 receives incoming transmissions and routes them to a number of VOIP gateways 214, 216, and 218. Each input to one of the gateways 214, 216, and 218 may include a number of transmissions. Moreover, given that there may be a very large number of incoming transmissions represented in FIG. 2 by phones 204 and 208, it may be necessary to have considerably more gateways than the three shown in FIG. 2. As a result, conventional IP GW 220, which combines the transmissions for sending over IP Network 118, receives a very large number of packet-based transmissions via connection 222, which may be part of, for example, an Ethernet-based network, or some other type of shared-access network, such as an isochronous network (in which data flow is managed such that it flows continuously and at a steady rate, and in close timing with a necessary timing of a receiving device). As referred to above and explained in more detail below, such sharing of a common network resource such as IP GW 220 is a cause of jitter.

Figure 3:
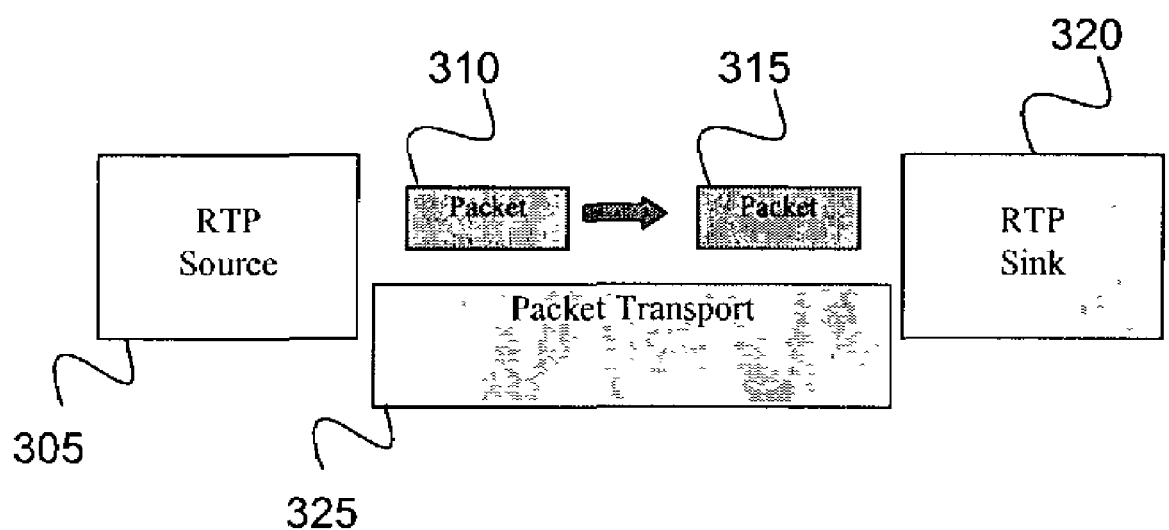
FIG. 3 is a block diagram illustrating a first abstract version of the simplest case of a real-time, packet-based communications network.

FIG. 3 illustrates an abstract version of the simplest case of a real-time, packet-based communications network. Specifically, FIG. 3 demonstrates that Real Time Protocol ("RTP") source 305 transmits packets 310 and 315 to RTP sink or destination device 320, via packet transport medium 325.

Figure 4:
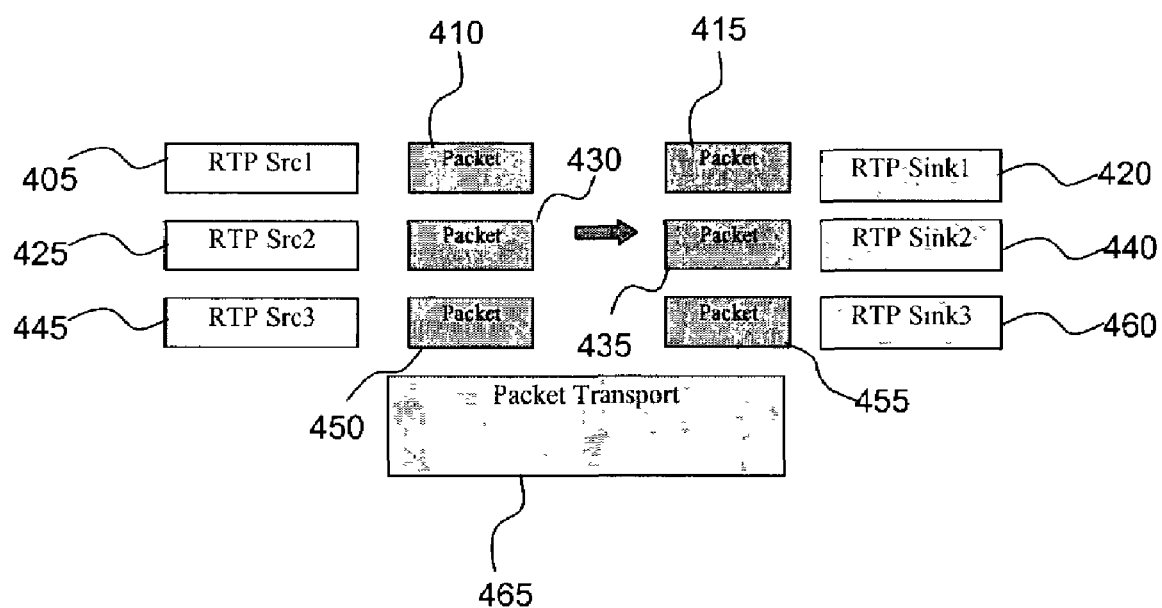
FIG. 4 is a block diagram illustrating a second abstract representation of a real-time, packet-based communications network.

FIG. 4 illustrates an abstract representation of a more complicated real-time, packet-based communications network. In FIG. 4, RTP source 405 sends packets 410 and 415 to RTP sink 420. Similarly, RTP source 425 sends packets 430 and 435 to RTP sink 440. Finally, RTP source 445 sends packets 450 and 455 to RTP sink 460. All of packets 410, 415, 430, 435, 450, and 455 are transmitted via common packet transport medium 465. For example, sources 405, 425, and 445 might be analogous to VOIP gateways 214, 216, and 218 in FIG. 2.

In FIG. 4, each RTP source 405, 425, and 445 generates its respective packets at a recurring interval known as the "Packetization Interval" or "PI." If RTP source 405 attempts to send packets 410 and 415 via packet transport medium 465 at the same time that RTP source 425 attempts to send packets 430 and 435 via packet transport medium 465, then the packets of one of the two source devices may be delayed relative to its desired resource usage envelope by virtue of a collision between two of the respective sets of packets. This delay, as referred to above, is conventionally known as jitter, and is particularly problematic in the context of real-time, packet-based communications, as is also discussed above.

Figure 5:
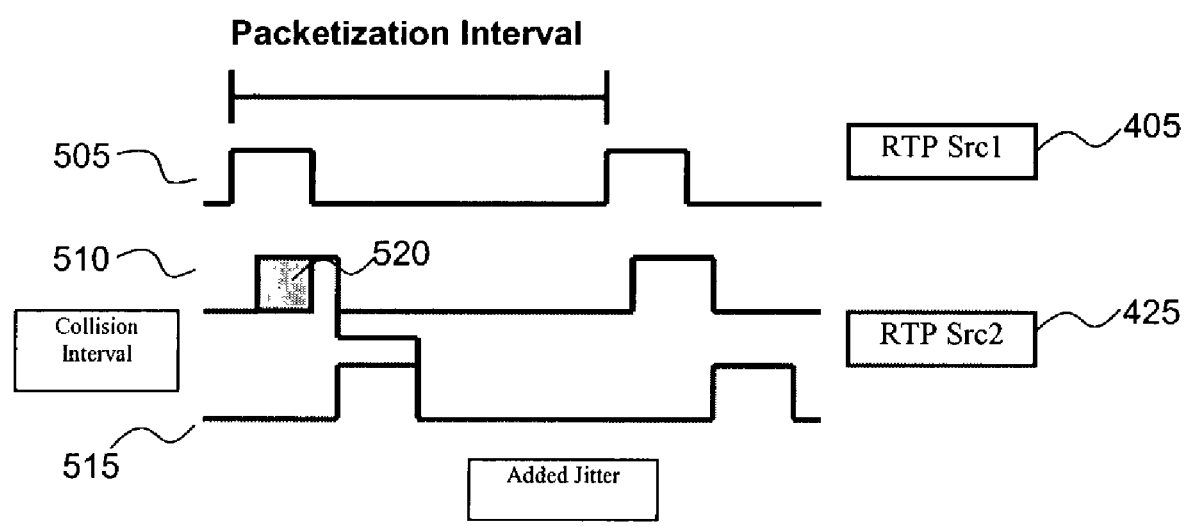
FIG. 5 is a timing diagram illustrating an effect of jitter on a packet-based communication.

FIG. 5 is a timing diagram illustrating an effect of jitter on a packet-based communication. In FIG. 5, signal 505 from RTP source 405 attempts to use packet transport medium 465 at the same time as signal 510 emanating from RTP source 425. As a result, and as demonstrated by signal 515, collision interval 520 causes signal 510 to be delayed by a length of one packet, which has the effect of adding jitter to signal 515.

In FIGS. 4 and 5, it is assumed that, for example, packets 410 and 415 transmitted by RTP source 405 are packets from a single packet-based communication (such as a single voice conversation). However, an actual RTP source might in fact need to access a common communications link a multiple number of times. For example, an RTP source such as VOIP GW 214 (FIG. 2) might provide multiple channels worth of services (such as multiple voice conversations). In such cases, the RTP source may need to issue multiple packets. In such a case, added jitter would be experienced by a second RTP source as the first source acquires the shared communications resource (i.e., IP GW 220) and locks it for the duration of its transmission.

Figure 6:
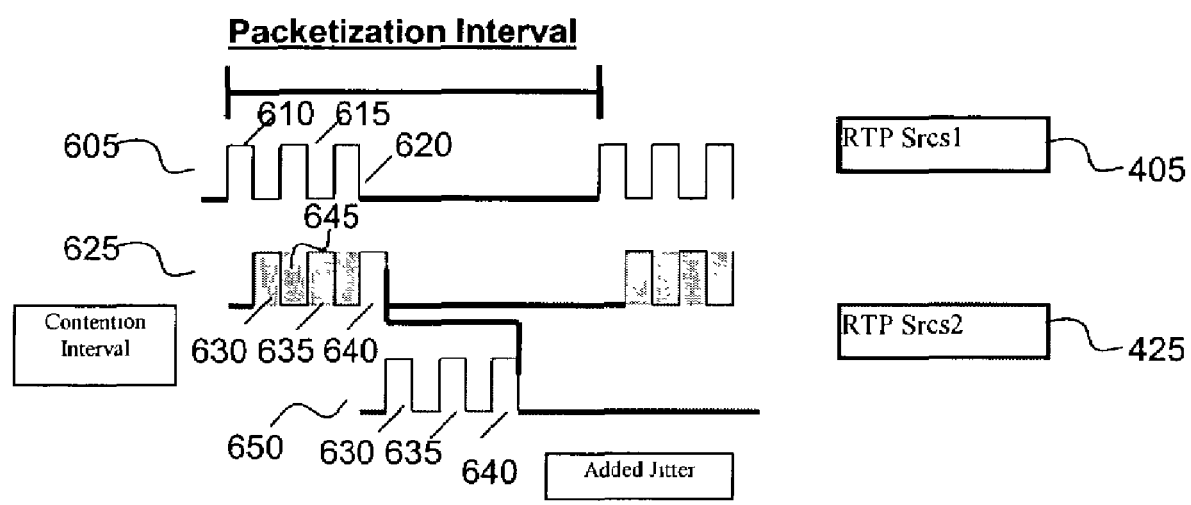
FIG. 6 is a timing diagram illustrating an effect of jitter on a packet-based communication.

FIG. 6 illustrates an example of such a case, in which RTP source 405 transmits a signal 605 including independent packets 610, 615, and 620. Similarly, RTP source 425 transmits signal 625, which includes independent packets 630, 635, and 640. As shown in FIG. 6, the contention interval 645 caused by a simultaneous attempt of signals 605 and 625 to access packet transport medium 465 causes signal 625 to be delayed and become corresponding signal 650, having added jitter with respect to signal 625.

Figure 7:
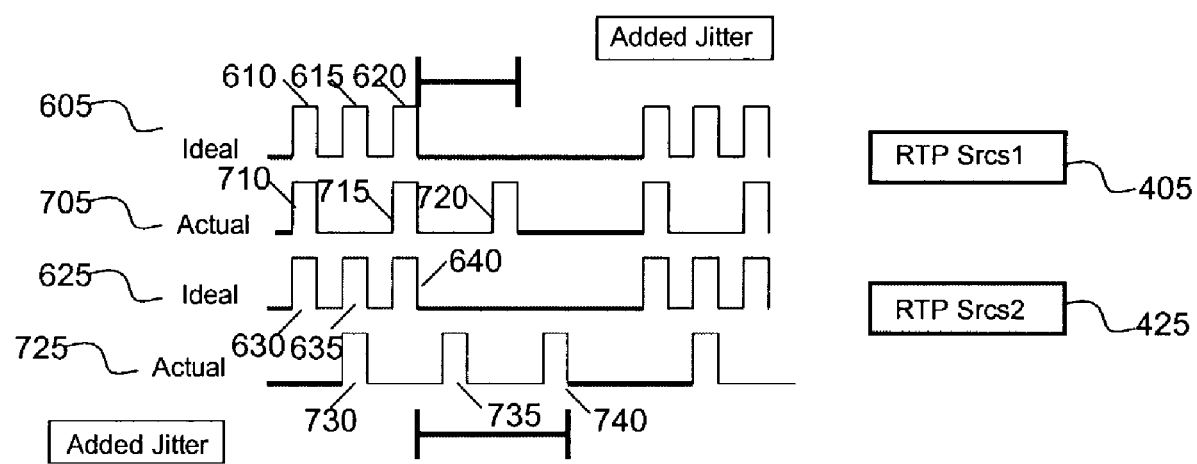
FIG. 7 is a timing diagram illustrating an example in which RTP sources transmit a plurality of independent packet-based communications.

FIG. 7 illustrates a second example in which RTP sources transmit a plurality of independent packet-based communications. In FIG. 7, RTP source 405 again transmits signal 605 having independent packets 610, 615, and 620. Similarly, RTP source 425 transmits signal 625, which includes independent packets 630, 635, and 640. In FIG. 7, however, signal 625 is not simply delayed by an amount equal to or greater than contention interval 645. Rather, packets 610-620 become interleaved with packets 630-640, as shown in FIG. 7 by signal 705 having packets 710, 715, and 720, as well as by signal 725 having packets 730, 735, and 740. In such a case, each RTP source 405 and 425 experiences a different amount of jitter, the sum of which might actually be greater than if the jitter was experienced by only one source, such as in the case shown in FIG. 6. The additional jitter experienced in the case of FIG. 7 with respect to FIG. 6 may be due, for example, to overhead associated with contention between various packets.

As illustrated by FIGS. 1-7, then, jitter generally represents a delay or disruption of one packet-based signal relative to another, and is generally due to an attempt by both of the signals to access a common transport medium at the same time. One solution to minimizing jitter would be to underutilize network bandwidth by either putting a smaller number of RTP transmission streams on a given network (i.e., providing less data), or over-provisioning the network with excess bandwidth (i.e., provide a bigger "pipe"). Neither of these strategies, however, is very cost-effective.

Another strategy for dealing with jitter is simply to ignore the problem. This "solution" may be suitable in many cases. For example, in the relevant cases shown in FIGS. 1 and 2, a typical packet length may be one tenth or one hundredth of a millisecond, or even less, whereas a typical packetization interval for a transmitting source may be 30 milliseconds or more. In such a scenario, the odds of collision between competing packet-based communications are relatively low.

Additionally, in FIG. 2 or in other similar scenarios, it is often the case that significant delay is imparted to a packet-based transmission simply as a result of being transmitted via IP Network 118, due to random delays and bottlenecks on the larger network itself. Because of these network-based delays, it is often the case that a recipient device will utilize a buffer (not shown) that stores a small portion of an incoming voice communication, so that thereafter the transmission may be provided continuously to a user of the device. Generally, a delay associated with this buffer will be relatively larger than a delay associated with the jitter stemming from scenarios described in FIGS. 4-7. In such a case, the type of jitter or delay associated with FIGS. 4-7 may be relatively insignificant.

Nonetheless, as quality of the non-local network, such as IP Network 118, improves, a locally imparted jitter may become significant compared to the jitter associated with the non-local network, such that a significant reduction in overall jitter may be realized by reducing the local network jitter. Moreover, as more and more devices are utilized to transmit packet-based communications via a given packet transport medium, the locally-generated jitter may become more and more of a problem. For example, in the case of FIG. 2, the number of users accessing a dial-around provider at VOIP GW site 202 may be relatively very large. Thus, if a packet length were approximately 1 millisecond (an exaggerated packet length for the sake of example), and a packetization interval were 30 milliseconds, VOIP gateways 214, 216, and 218 might only be able to transmit a handful of voice conversations before a significant number of collisions (an associated jitter) begins to occur.

Another alternative in reducing jitter in an environment such as those described in FIGS. 1-7 involves providing a master clock to which all RTP sources have access. For example, a master clock might be provided for VOIP gateways 214, 216, and 218 at VOIP GW site 202. If such a master clock is used to coordinate transmissions from the sources, then theoretically the sources may be timed so that packets do not collide with one another. Such an approach, however, can be relatively expansive, calculation-intensive, and can inherently provide a single point of failure for the entire system.

A final example of reducing jitter is a network access protocol that is isochronous in nature rather than contention-oriented. Examples of these types of protocols include isochronous Ethernet, 802.9a ISLAN (Multimedia LAN Support), IEEE 1394 (FireWire), USB, and token ring networks, all of which provide some type of synchronous data transport.

More specifically, such network solutions are typically either token-based in nature (i.e., pertain to processes in which one process must wait on the completion of another process before the first process may continue), or isochronous. Such processes can generally be thought of as examples of techniques in which an access method is established to determine beforehand that a packet collision may take place, and delays transmission from one or more sources until such time that the collisions will not occur.

None of these techniques for coordinating packet flow, however, have enjoyed widespread commercial acceptance. Some reasons for this might include the limits on performance that are inherent to some of the techniques, as well as incompatibilities with standard network routers. Contention-oriented networks, such as Ethernet, in comparison continue to be cheap, widely available, and, moreover, available at ever-increasing speeds.

Implementations of the present invention provide a solution for minimizing collisions and real-time, packet-based communications in an efficient, reliable, and scalable matter. These implementations are applicable to either contention-based networks or isochronous networks. Thus, these implementations do not require isochronous transmission media to operate effectively, nor do they necessarily require a global clock available to all transmitting RTP sources that is absolutely synchronized with clocks of each of the sources. In these implementations, in no case is jitter made worse, while in most cases, jitter is substantially reduced. Implementations are relatively inexpensive to implement, and reduce an amount of memory likely to be used on routers, thus reducing a likelihood that packets might need to be dropped by the router. Such a reduction in the number of dropped packets correspondingly results in perceived improvement of quality of service to the end user. Moreover, implementations of the present invention allow individual RTP sources in a network to coordinate packet transmission among themselves, rather than requiring a central point of traffic management. As a result, these implementations are more reliable and more robust than solutions of the prior art, and may thus also be used as a backup system to prior art solutions, in order to ensure continued service.

Figure 8:
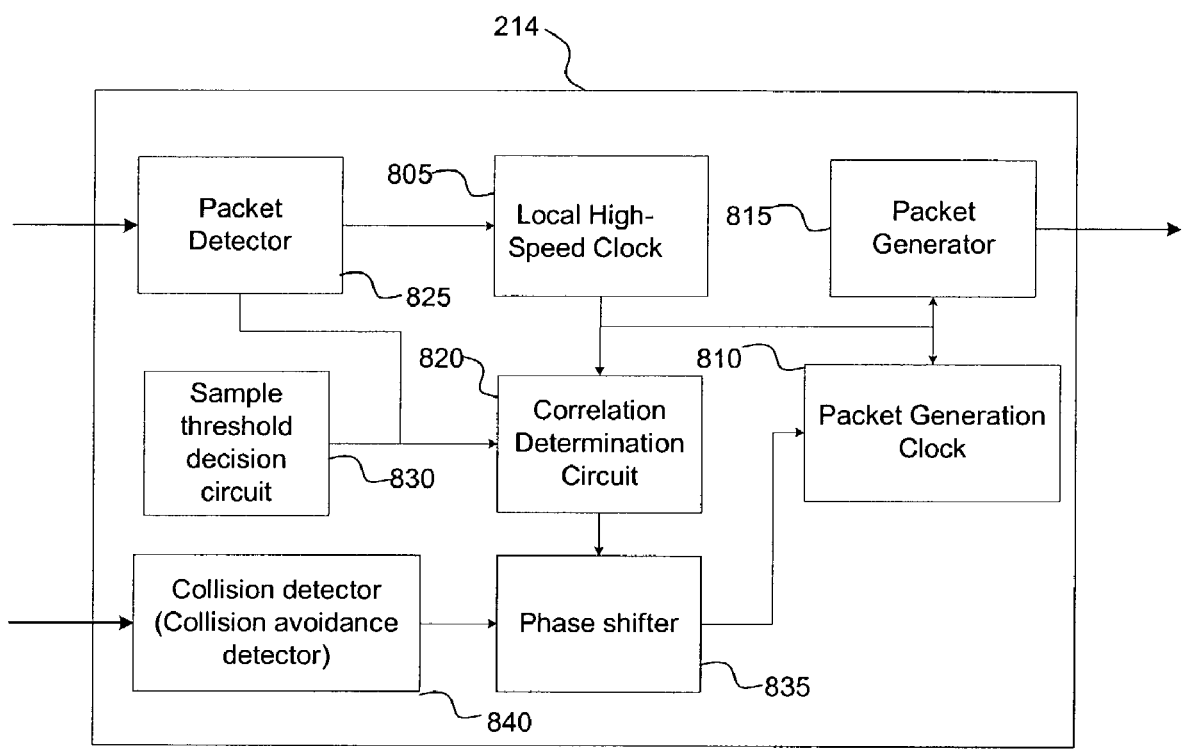
FIG. 8 is a block diagram illustrating an RTP source according to one implementation of the invention.

FIG. 8 illustrates an RTP source according to one implementation of the invention. In FIG. 8, the RTP source is considered to be a VOIP GW 214 included in dial-around provider's VOIP GW site 202, as shown in FIG. 2. However, the source could be any of the RTP sources discussed above, or one of other conventional RTP sources. In VOIP GW 214, a local high-speed clock 805 is available to serve as a master clock for the VOIP GW 214, having a relatively high precision for the source 214. Such a local high-speed clock 805 may have a precision level on the order of $10^{-6}$ s.

A packet generation clock 810 is also provided, which serves to time the packetization interval by which a packet generator 815 generates packets. The packet generation clock 810 is timed off of the local high-speed clock 805, and generally is operated to select packetization intervals in the range of, for example, 30-50 milliseconds.

Results from packet detector 825 regarding the frequency of traffic flow via the shared packet transport medium are transmitted to a correlation determination circuit 820. Correlation determination circuit operates off of timing information received from local high-speed clock 805 and packet generation clock 810, and performs a statistical analysis by which it determines a point in the transmission flow during which collisions between packets from source 214 and packets from any other sources sharing the common packet transport medium will be least likely to occur. A sample threshold decision circuit 830 is used to set a time period over which such measurements will be taken before a usable prediction is attained. Such a threshold time period may be on the order of, for example, approximately ½ to 1 second.

By performing what is essentially an autocorrelation analysis of the packet-based traffic flow, the correlation determination circuit 820, as just mentioned, determines a "gap" in the packet transmission flow, during which packet generator 815 may generate packets without fear of collision. An autocorrelation analysis may be used to detect non-random components within a seemingly random background, because autocorrelation functions of non-random data persist over all time displacements, while autocorrelation functions of random processes tend to zero for relatively large time displacements.

Correlation determination circuit 820 feeds this information to a phase shifter 835, which determines an amount by which a packetization interval of packet generator 815 must be shifted (either forward or backward in time), and transmits this phase information to packet generation clock 810. Packet generation clock 810 may thus start a new packet transmission timing having a reduced likelihood of packet collisions.

Subsequently, a collision detector 840 may also monitor packet flow via the common packet transport medium, which now includes packets from source 214 itself. Collision detector 840 detects whether, despite the best efforts of correlation determination circuit 820, any collisions actually occur. If collisions are detected, such information is fed to phase shifter 835, which again determines a necessity for an adjustment in time of the packetization interval of packet generator 815, and accordingly transmits this information to packet generation clock 810 for adjustment of a timing of packet generator 815.

Figure 9:
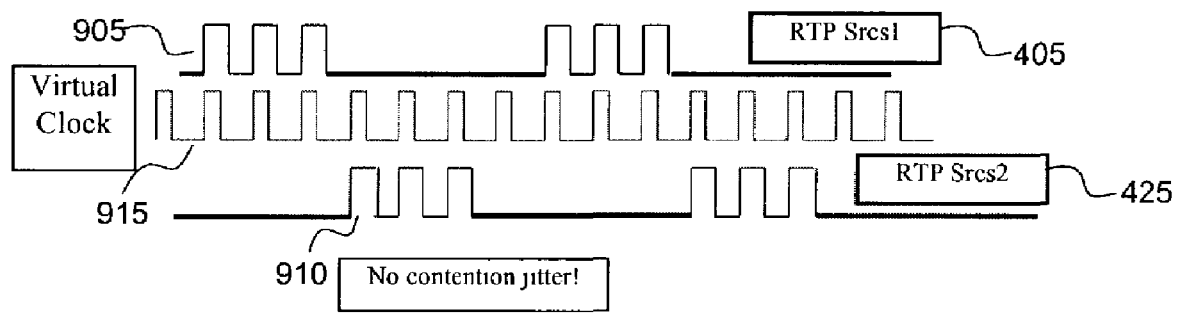
FIG. 9 is a timing diagram illustrating a virtual clock established according to one implementation of the invention.

As a result of the operations of the RTP source 214 in FIG. 8 in conjunction with other sources sharing the same packet transport medium, a "virtual clock" is established between the source 214 and other RTP sources, whereby the sources may reduce a chance of packet collisions. FIG. 9 illustrates an established virtual clock for a situation in which RTP source 405 transmits a signal 905, while RTP source 425 transmits a signal 910. In FIG. 9, a virtual clock signal 915 is established by the operations described above with respect to FIG. 8. Therefore, as demonstrated by comparison of signal 910 to signal 905, no contention-based jitter occurs.

By the operations described above with respect to FIGS. 8 and 9, contention-based jitter can be avoided for at least a few packet transmissions at a time. Due to drifts in time between clock signals of local high-speed clock 805 and its counterpart or counterparts on the other RTP sources, however, contention may begin to occur again after a few intervals of packet transmission. Even in such a case, implementations of FIGS. 8 and 9 will be capable of adapting and reestablishing an appropriate transmission interval. Implementations of FIGS. 8 and 9 will also be able to adapt to a situation where new periodic packet flows are introduced to the system, or even when aperiodic transmission flows are introduced into the system. These implementations are thus robust, reliable, efficient, and adaptive.

Figure 10:
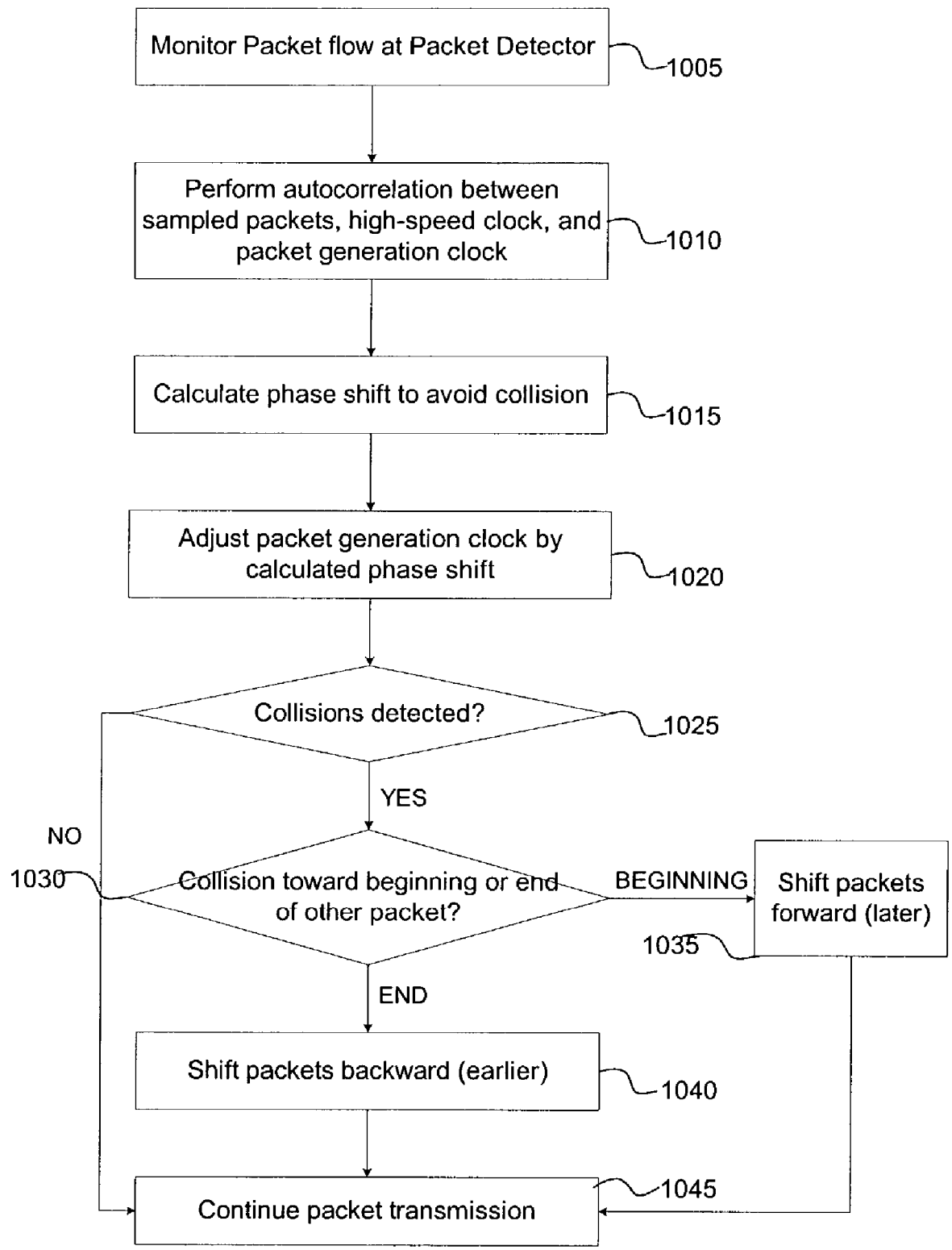
FIG. 10 is a flow chart illustrating a process flow according to one implementation of the invention.

FIG. 10 illustrates a process flow for the implementations described above with respect to FIGS. 8 and 9. In operation 1005, a packet flow occurring from at least one other RTP source via a common packet transport medium is monitored by packet detector 825. In step 1010, correlation determination circuit 820 performs the autocorrelation calculation between the sample packets using inputs from high-speed clock 805, packet generation clock 810 and sample threshold decision circuit 830. Thus, an operation 1015, phase shifter 835 is able to use a result of the autocorrelation calculation to calculate a shift in phase needed to avoid packet-based collisions. In operation 1020, then, phase shifter 835 may adjust a timing of packet generation clock 810 such that packet generator 815 subsequently transmits packets into an interval determined by the autocorrelation calculation.

Subsequently, an operation 1025, collision detector 840 monitors traffic flow over the common packet transport medium, and determines whether any collisions between packets from packet generator 815 and the remaining traffic flow actually occur. If no collisions are detected, the process proceeds to operation 1045, in which packet transmission is continued at the prior timing. If collisions are detected, then, in operation 1030, a determination is made as to whether the collisions appear to occur toward a beginning or end of a packet transmission of another RTP source. If the collision occurs at the beginning of the packets transmitted by packet generator 815, then packets should be shifted in time by phase shifter 835 to move forward in time, i.e., should be transmitted at a slightly later time. Conversely, if the collision appears to occur toward an end of a packet transmitted by packet generator 815, then, in operation 1040, packets should be shifted backward in time, i.e., should be transmitted slightly earlier by packet generator 815. In either case of shifting forward or backward in time, operation 1045 then proceeds to continue packet transmission according to that timing, whereupon process 1000 may repeat itself.

In the implementations of FIGS. 8-10, then, an appropriate timing may be selected to avoid collisions by packets from packet generator 815 with packets from any other RTP source in the network sharing the common packet transport medium. Even if such collisions do occur, the implementations may adjust on the fly to take the collisions into account and minimize future collisions. Moreover, the peer-to-peer nature of communications between the RTP sources as described above allow the system of data sources to be essentially self-initializing.

Furthermore, additional operations can be included in these implementations to protect against collisions which occur due to drift or other sources of error. These solutions may add additional expense or complication; nonetheless, they may be useful in certain scenarios.

For example, if it is known that the local high-speed clock 805 has a same frequency as corresponding clocks in other RTP sources, but a phase relationship between the clocks is unknown, then drift can be minimized. If the clocks are aware of one another's frequency and phase information, i.e., if an absolute time clock is available between the RTP sources, then drift can be minimized virtually to zero. If the clocks of the RTP sources know neither the frequency nor the phase of one another's' clocks, a logical absolute time reference can be established to eliminate drift. For example, the network time protocol ("NTP," which is generally a network of clocks available to provide a clock reference via the Internet) can be used to synchronize the clocks. If such an absolute time clock is available, moreover, it is possible that it may be used as a primary timing mechanism, in which case, the implementations of the invention described above may be used as a robust backup system.

Allocation of bandwidth in the above implementations may be implemented in a variety of manners. For example, available network bandwidth may be divided into equal intervals of time, during which each RTP source may send its data in its assigned slots. In this case, the sizes of the slots should be proportional to the amount of data that each RTP source might need to send. This allocation may be particularly useful where packetization intervals of the RTP sources are equal to one another. If the packetization intervals are not equal, bandwidth may be dynamically allocated to each RTP source according to its actual usage at that time, or may be statically allocated with the assumption of allowing maximal possible usage by each RTP source. Dynamic allocation may lead to bandwidth over-commitment, but allows near maximal utilization. Conversely, static allocation allows guaranteed allocations, but may be perceived to "waste" some bandwidth. An end user of the RTP sources may decide on an appropriate bandwidth allocation for a given use.

Although the implementations discussed above have primarily been in relation to contention-based networks, isochronous networks may also benefit from the concepts described in relation to FIGS. 8-10. For example, in an isochronous network, collisions are reduced by use of a packet delay sensor, in which a central coordinator of network traffic determines in advance that a collision would occur and delays one or the other traffic flows accordingly. Although collisions should not theoretically occur in such a situation, it would still be advantageous to determine that a collision would have occurred and alter a packet transmission of a source accordingly (rather than avoid collisions on a pre-emptive, but ad hoc, basis).

In the case of the isochronous network, then, source 214 in FIG. 8 may utilize a collision avoidance detector in place of collision detector 840, with the rest of the procedures for implementing the implementation of FIG. 8 remaining largely the same as set forth above with respect to FIGS. 8-10.

Implementations discussed herein have a number of uses. They may be used to facilitate some or all of the connections discussed with respect to FIG. 1. In FIG. 2, it should be apparent that not all of VOIP gateways need to implement the functionality described above for an advantage to be gained; i.e., the implementations described are useful in both a heterogeneous and a homogeneous environment.

Other uses exist which are not explicitly discussed above. For example, many enterprises have a "call center," for, for example, fielding complaints and questions from customers. Such call centers may utilize a PBX and associated computer network to pull customer information automatically, based on attributes of an incoming call, such as the caller's phone number. In this way, a customer service representative may determine that a caller is a customer who recently ordered an item that has yet to ship. Before even answering the call, the customer service representative may know to determine that the order is scheduled for shipment tomorrow, and may thus answer the caller's question promptly.

While convenient for customers, such call centers are expensive for enterprises to maintain, both in terms of equipment required and salaries for the customer services representative. Implementations described herein, by reducing jitter and making real-time packet-based communications via a network a practical option, allow a company to easily route the incoming call and associated customer information to a remote location, such as to an employee working out of his or her house and having a cable modem installed on his or her PC. In this way, the employee will receive the call via the PC, and, just as the call center customer service representative did, will view the relevant customer and product information before even answering the call. In this way, the enterprise may reduce overhead costs significantly, while still providing customer service via a phone connection that does not seem substandard to the customer.

Thus, implementations described above provide a self-initializing technique for reducing collision between packets emanating from multiple RTP sources and sharing a common packet transport medium. Collisions are reduced in a scalable and efficient manner, and a quality of services provided to users may be correspondingly greatly improved.

A number of implementations have been described. Nevertheless, it will be understood that various modifications may be made. Accordingly, other implementations are within the scope of the following claims.

What is claimed is:

1. A method for transmitting data, the method comprising:
    monitoring a packet-based traffic flow to obtain traffic flow information;
    calculating, based on the traffic flow information and a clock signal obtained from a clock, a transmission interval for transmitting a packet-based communication into the packet-based traffic flow;
    selectively modifying the transmission interval in response to the traffic flow information;
    determining a phase adjustment sufficient to alter a transmission timing of the packet-based communication to coincide with transmission into the transmission interval;
    transmitting the packet-based communication into the packet-based traffic flow during the transmission interval, based on the clock signal, by adjusting a phase of the packet-based communication by the phase adjustment;
    communicating with one of a plurality of data sources to establish a virtual clock, the virtual clock thereafter being maintained by each of the plurality of data sources and being operable to govern a timing of transmission of the packet-based communication; and
    adjusting a phase of packets in the packet-based communication in accordance with the virtual clock.

2. The method of claim 1, wherein the transmission interval provides a time period having a reduced chance of collision between the packet-based communication and the packet-based traffic flow relative to an uncorrelated transmission of the packet-based communication into the packet-based traffic flow.

3. The method of claim 1, wherein selectively modifying the transmission interval further comprises:
    detecting a collision between the packet-based communication and the packet-based traffic flow; and
    selecting a modified transmission timing of the packet-based communication relative to the packet-based traffic flow.

4. The method of claim 3, wherein the modified transmission timing provides a reduction in the chance of collision relative to a non-modified transmission timing.

5. The method of claim 1, wherein calculating a transmission interval comprises performing a correlation analysis based on the clock signal and the packet-based traffic flow.

6. The method of claim 5, wherein the clock is a high-speed clock local to a source of the packet-based communication.

7. The method of claim 5, wherein the clock is a packet-generation clock and the clock signal provides a timing for packet generation.

8. The method of claim 5, wherein performing the correlation analysis comprises inputting a sample threshold determining a length of time over which the monitoring of the packet-based traffic flow occurs.

9. The method of claim 1, further comprising:
    minimizing a drift in the clock signal relative to a second clock signal based on a master clock signal having a timing that is known relative to the clock signal and the second clock signal.

10. The method of claim 1, wherein the packet-based traffic flow and the packet-based communication occur via a contention-based network.

11. The method of claim 1, wherein the packet-based traffic flow and the packet-based communication occur via a isochronous network.

12. A system for transmitting data, the system comprising:
    a packet detector operable to monitor a packet-based traffic flow and thereby obtain traffic flow information;
    a clock operable to output a clock signal;
    a correlation determination circuit operable to calculate a transmission interval and to selectively modify the transmission interval in response to the traffic flow information and the clock signal;
    a packet generator operable to generate a packet-based communication in approximate synchronization with the transmission interval;
    a phase shifter operable to adjust a transmission timing of the packet generator to thereby achieve approximate synchronization between the packet-based communication and the transmission interval; and
    a transmission coordination circuit operable to communicate with one of a plurality of data sources to establish a virtual clock, the virtual clock thereafter maintained by each of the plurality of data sources and operable to govern a timing of packet transmission by the packet generator,
    wherein the phase shifter is operable to adjust a phase of packets in the packet-based communication in accordance with instructions from the transmission coordination circuit.

13. The system of claim 12, further comprising a collision detector operable to detect a collision between the packet-based communication and the packet-based traffic flow, the collision detector being further operable to output a collision detection signal to the phase shifter.

14. The system of claim 13, wherein the packet-based traffic flow and the packet-based communication occur via a contention-based network.

15. The system of claim 12, further comprising a collision avoidance detector operable to detect a delayed transmission of the packet-based communication with respect to the packet-based traffic flow, the collision avoidance detector being further operable to output a collision detection signal to the phase shifter.

16. The system of claim 15, wherein the packet-based traffic flow and the packet-based communication occur via an isochronous network.

17. The system of claim 12, wherein the clock is a high-speed clock that is local to the system.

18. The system of claim 12, wherein the clock is a packet generation clock operable to set a timing of the packet-based communication generated by the packet generator.

19. The system of claim 12, further comprising a sample threshold decision circuit operable to determine a length of time over which the packet detector monitors the packet-based traffic flow, the sample threshold decision circuit being further operable to output the length of time to the correlation determination circuit.

20. The system of claim 12, wherein the correlation determination circuit is further operable to calculate the transmission interval based on a correlation analysis based on the clock signal and the packet based traffic flow.

21. A computer having a processor for executing instructions stored on an associated storage media, the instructions including:
- a first code segment for monitoring a packet-based traffic flow;
- a second code segment for calculating a transmission interval for transmitting a packet-based communication, the transmission interval providing a first reduction in a chance of collision between the packet-based communication and the packet-based traffic flow;
- a third code segment for selectively modifying the transmission interval in response to the traffic flow information and thereby for providing a second reduction in the chance of collision;
- a fourth code segment for selectively adjusting the phase of the packet-based communication to approximately synchronize the transmission timing of the packet-based communication with the transmission interval;
- a fifth code segment for transmitting the packet-based communication; and
- a sixth code segment for communicating with one of a plurality of data sources to establish a virtual clock, the virtual clock thereafter being maintained by each of the plurality of data sources and being operable to govern a timing of transmission of the packet-based communication; and
- a seventh code segment for adjusting a phase of packets in the packet-based communication in accordance with the virtual clock.

22. The computer of claim 21, the instructions further comprising an eighth code segment for detecting a collision between the packet-based communication and the packet-based traffic flow.

23. A system for transmitting data, the system comprising a plurality of data sources, the plurality of data sources each transmitting data via a common transport medium, each of the plurality of data sources comprising:
- a packet generator operable to generate packets for transmission via the common transport medium;
- a transmission coordination circuit operable to communicate with remaining ones of the plurality of data sources to establish a virtual clock, the virtual clock thereafter being maintained by each of the plurality of data sources and being operable to govern a timing of packet transmission by the packet generator;
- a phase adjuster operable to adjust a phase of the packets in accordance with instructions from the transmission coordination circuit; and
- a packet-monitoring subsystem operable to monitor data traffic output by the packet generator and by remaining ones of the plurality of sources via the common transport medium,
wherein the transmission coordination circuit outputs a correlation analysis based on the first clock signal, the second clock signal, and a monitoring results signal output by the packet-monitoring subsystem, and
wherein the phase adjuster adjusts a phase of the packets based on the correlation analysis.

24. The system of claim 23, wherein the data sources communicate in a peer-to-peer fashion to establish the virtual clock.

25. The system of claim 23, wherein the data source further comprises:
- a high-speed clock local to the data source and operable to output a first clock signal that governs operations of the data source; and
- a packet-generation clock operable to receive the first clock signal and output a second clock signal that governs a timing of the packet generator.

26. The system of claim 25, wherein the phase adjuster inputs a collision detection signal from the packet-monitoring subsystem, the collision detection signal representing a collision between the packets and data traffic output by the remaining ones of the plurality of sources via the common transport medium, and further wherein the phase adjuster determines an adjustment in phase of the packets based on the collision detection signal.

* * * * *